United States Patent
Gupta et al.

(10) Patent No.: US 10,868,749 B2
(45) Date of Patent: Dec. 15, 2020

(54) METHOD AND APPARATUS FOR DISCOVERING NEIGHBORHOOD AWARENESS NETWORKING DEVICES BASED ON PRESENCE

(71) Applicant: Motorola Mobility LLC, Chicago, IL (US)

(72) Inventors: Ranjeet Gupta, Chicago, IL (US); Gabriel Burca, Palatine, IL (US); Mary Hor-Lao, Chicago, IL (US); Binesh Balasingh, Naperville, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 450 days.

(21) Appl. No.: 15/219,702

(22) Filed: Jul. 26, 2016

(65) Prior Publication Data
US 2018/0035356 A1    Feb. 1, 2018

(51) Int. Cl.
| | |
|---|---|
| *H04W 48/08* | (2009.01) |
| *H04W 40/24* | (2009.01) |
| *H04L 12/26* | (2006.01) |
| *H04W 8/00* | (2009.01) |
| *H04W 48/16* | (2009.01) |
| H04W 84/14 | (2009.01) |

(52) U.S. Cl.
CPC ............. *H04L 43/16* (2013.01); *H04W 8/005* (2013.01); *H04W 40/244* (2013.01); *H04W 48/16* (2013.01); *H04W 84/14* (2013.01)

(58) Field of Classification Search
CPC ... H04W 48/08; H04W 40/24; H04W 40/244; H04L 43/16
See application file for complete search history.

(56) References Cited

U.S. PATENT DOCUMENTS

| | | | |
|---|---|---|---|
| 7,864,744 | B2 | 1/2011 | Song et al. |
| 9,049,578 | B2 | 6/2015 | Abraham et al. |
| 9,125,124 | B2 | 9/2015 | Dwivedi et al. |
| 9,258,193 | B2 | 2/2016 | Kasslin et al. |
| 9,398,437 | B2 | 7/2016 | Kasslin et al. |
| 9,439,174 | B2 | 9/2016 | Yu et al. |
| 9,480,013 | B2 | 10/2016 | Fang et al. |
| 9,554,344 | B2 | 1/2017 | Huang et al. |
| 9,578,626 | B2 | 2/2017 | Sadasivam et al. |
| 9,693,217 | B2 | 6/2017 | Kasslin et al. |
| 9,763,190 | B2 | 9/2017 | Abraham et al. |
| 9,801,039 | B2 | 10/2017 | Oren et al. |
| 9,820,117 | B1 | 11/2017 | Tran et al. |
| 2009/0003253 | A1* | 1/2009 | Wang ................... H04W 28/18 370/311 |
| 2014/0156833 | A1* | 6/2014 | Robinson ............... H04L 43/12 709/224 |

(Continued)

*Primary Examiner* — Charles C Jiang
*Assistant Examiner* — Voster Preval

(57) ABSTRACT

A method and apparatus includes a communication device monitoring for an indication of presence with respect to the communication device. The method involves transmitting, when detecting the indication of presence, a first series of neighborhood awareness networking discovery beacon frames having a first interframe time interval. The method further involves transmitting, when not detecting the indication of presence, a second series of neighborhood awareness networking discovery beacon frames having a second interframe time interval that is longer than the first interframe time interval.

18 Claims, 6 Drawing Sheets

(56) References Cited

U.S. PATENT DOCUMENTS

| | | | |
|---|---|---|---|
| 2015/0296458 A1* | 10/2015 | Abraham | H04W 56/00 |
| | | | 370/311 |
| 2017/0013416 A1* | 1/2017 | Daoud | H04W 40/20 |
| 2017/0019853 A1* | 1/2017 | Ghosh | H04W 52/0216 |
| 2017/0086157 A1* | 3/2017 | Abraham | H04W 72/06 |
| 2017/0290029 A1* | 10/2017 | Park | H04W 48/16 |
| 2017/0290070 A1* | 10/2017 | Zhang | A61B 5/02438 |
| 2017/0319675 A1* | 11/2017 | Weinschenk | A61K 45/06 |
| 2017/0347359 A1* | 11/2017 | Yang | H04W 52/24 |
| 2018/0007060 A1* | 1/2018 | Leblang | H04L 63/0853 |
| 2018/0027366 A1* | 1/2018 | Fujimori | H04W 52/0229 |
| | | | 455/41.2 |
| 2018/0213387 A1* | 7/2018 | Aoki | H04W 40/00 |
| 2018/0234934 A1* | 8/2018 | Pang | H04W 56/0015 |
| 2019/0090175 A1* | 3/2019 | Mestanov | H04W 4/023 |

\* cited by examiner

1

METHOD AND APPARATUS FOR DISCOVERING NEIGHBORHOOD AWARENESS NETWORKING DEVICES BASED ON PRESENCE

FIELD OF THE DISCLOSURE

The present disclosure relates generally to wireless communication and more specifically to discovering neighborhood awareness networking communication devices using different time intervals based on presence.

BACKGROUND

The popularity of proximity-based social and mobile services has grown significantly over the last few years, and the expectation is that it will continue to do so for the foreseeable future as the mobile ecosystem evolves. To meet demand for such services, neighborhood awareness networking (NAN) technology, such as Wi-Fi Aware™, was developed. A NAN protocol allows for the bidirectional sharing of information directly between nearby or proximate NAN devices without the need for an intermediary device such as a base station, access point, router, or other infrastructure device and without the need for a network connection. Accordingly, a NAN protocol is a proximity-based protocol that provides for transmissions and scanning procedures which facilitate NAN devices discovering other NAN devices within range or proximity, wherein a discovered NAN device, for instance, offers information or a service meeting a specified criteria.

One shortcoming relates to the current mechanism for locating or discovering other NAN devices within range. To do this, for instance using Wi-Fi Aware™, NAN devices continuously transmit NAN discovery beacon frames while also scanning for the NAN discovery beacon frames of other NAN devices. However, the transmission of and scanning for NAN discovery beacon frames comes at a power cost. In some cases, measurements and estimates show and predict that transmitting and scanning for NAN discovery beacon frames can account for approximately 50% of a mobile device's average power consumption over the course of a day.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
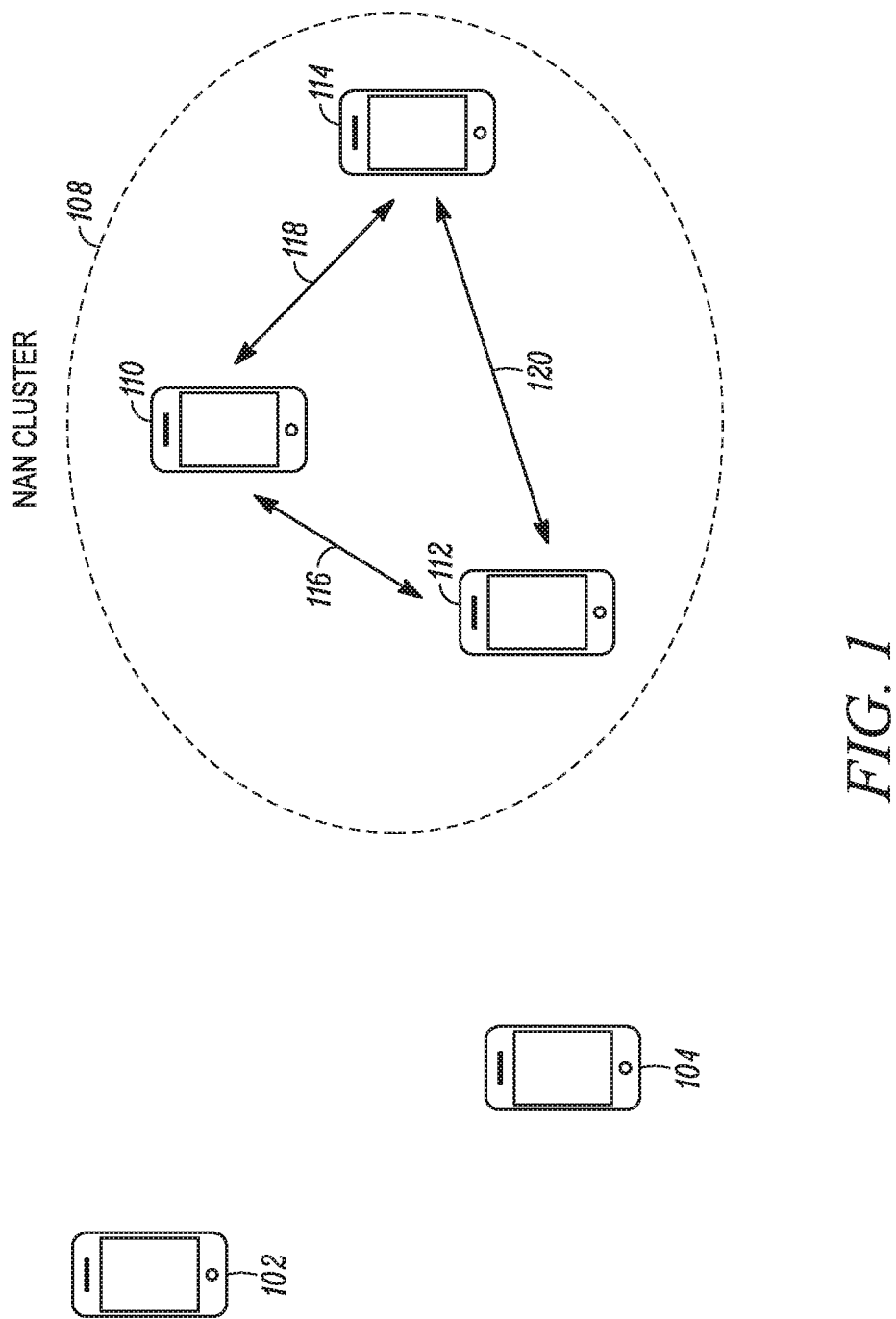
FIG. 1 shows a NAN communication device scanning for other NAN communication devices, three of which are pictured operating in a NAN cluster, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and apparatus for a NAN communication device to perform discovery with varying time intervals based on an indication of presence. More specifically, the NAN communication device transmits beacons and/or scans for beacons from another NAN communication device less frequently, to conserve power, when an indication of presence with respect to the NAN communication device is not detected. An indication of presence with respect to a NAN communication device is a condition, circumstance, status, or factor that represents an increased likelihood, as compared to when the indication of presence is absent, that a user of the NAN communication device wishes to discover and connect with other NAN communication devices to exchange a service or information.

In accordance with the teachings herein, a method performed by a NAN communication device includes monitoring for an indication of presence with respect to the NAN communication device. The method involves transmitting, when detecting the indication of presence, a first series of NAN discovery beacon frames having a first interframe time interval. The method involves transmitting, when not detecting the indication of presence, a second series of NAN discovery beacon frames having a second interframe time interval that is longer than the first interframe time interval.

Also in accordance with the teachings herein, a method performed by a NAN communication device includes monitoring for an indication of presence with respect to the NAN communication device. The method involves transmitting a first series of NAN discovery beacon frames with a first attribute when detecting the indication of presence. The method involves transmitting a second series of NAN discovery beacon frames with a second attribute when not detecting the indication of presence.

For one embodiment, the first attribute includes a first power level of transmission for the first series of NAN discovery beacon frames. The second attribute includes a second power level of transmission for the second series of NAN discovery beacon frames, wherein the second power level is less than the first power level.

For another embodiment, the first attribute includes a first interframe time interval for the first series of NAN discovery beacon frames. The second attribute includes a second interframe time interval for the second series of NAN discovery beacon frames, wherein the second interframe time interval is longer than the first interframe time interval.

Further in accordance with the teachings herein is a NAN communication device having a set of sensors to detect presence with respect to the NAN communication device and to provide an indication of the presence. The NAN communication device also has a transmitter to transmit NAN discovery beacon frames. The NAN communication device additionally includes a processing element coupled to the set of sensors and the transmitter. The processing element is used to monitor for an indication of presence with respect to the communication device. The processing element provides for transmission, when detecting the indication of presence, a first series of NAN discovery beacon frames including a first interframe time interval. The processing element provides for transmission, when not detecting the indication of presence, a second series of NAN discovery beacon frames including a second interframe time interval that is greater than the first interframe time interval.

For a particular embodiment, the NAN communication device further includes a receiver to receive NAN discovery beacon frames, wherein the receiver is coupled to the processing element. The processing element scans, when detecting the indication of presence, for NAN discovery beacon frames during a first scanning time interval. When not detecting the indication of presence, the processing element scans for NAN discovery beacon frames during a second scanning time interval that is shorter than the first scanning time interval.

NAN communication devices, also referred to simply as communication devices or NAN devices, are electronic devices configured to operate in accordance with a NAN protocol, such as Wi-Fi Aware™, by sending and scanning for NAN transmissions, such as NAN discovery beacon frames, NAN synchronization beacon frames, and NAN service discovery frames, in order to discover other NAN devices. NAN discovery beacon frames are also referred to simply as discovery beacon frames. A non-exhaustive list of electronic devices which can operate as NAN devices includes smartphones, phablets, tablets, laptops, e-book readers, portable media players, portable gaming devices, athletic monitoring devices, GPS navigation devices, desktop computers, and servers.

FIG. 1 shows a NAN device 102 scanning for other NAN devices. Also shown are three NAN devices 110, 112, 114 operating in a NAN cluster 108 and an isolated NAN device 104 not belonging to a NAN cluster. The NAN devices 102, 104, 110, 112, and 114 are configured to implement a NAN protocol by which these devices transmit NAN discovery beacon frames and scan for NAN discovery beacon frames transmitted by other NAN devices to facilitate the discovery of NAN devices and NAN clusters. For a particular embodiment, the NAN devices 102, 104, 110, 112, and 114 are configured in accordance with the "Neighbor Awareness Networking Technical Specification," Version 1.0, hereinafter "NANTSv1.0," issued by the Wi-Fi Alliance with regard to its Wi-Fi Aware™ program to transmit and scan for NAN discovery beacon frames, which are modified IEEE 801.11 beacon management frames. A more detailed description of a NAN device transmitting NAN discovery beacon frames and scanning for NAN discovery beacon frames is provided with reference to FIG. 4.

Figure 4:
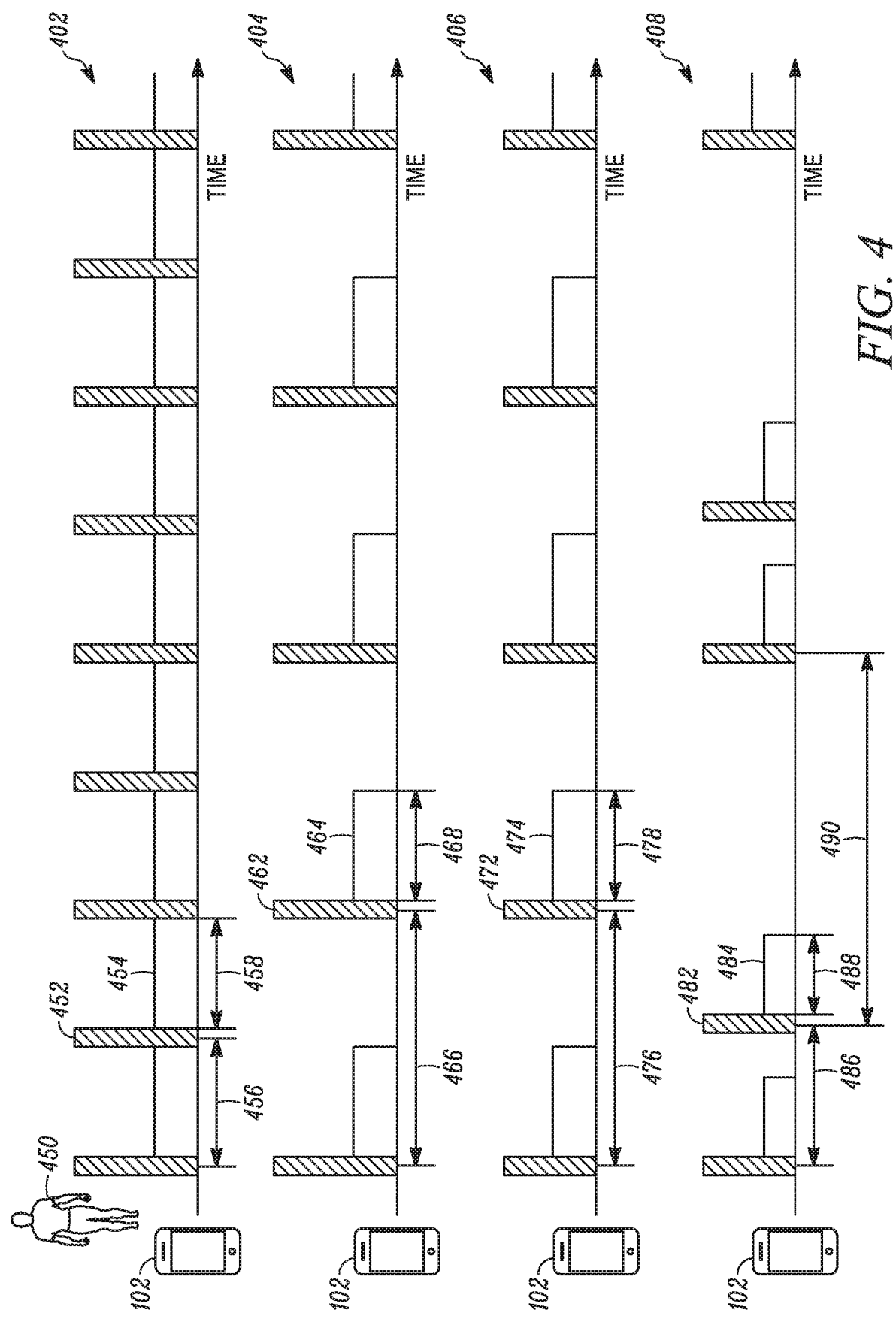
FIG. 4 shows a schematic diagram of a NAN communication device performing NAN transmitting with different interframe time intervals, in accordance with some embodiments.

Turning momentarily to FIG. 4, a first 402 of four pictured presentations 402, 404, 406, 408 shows the NAN device 102 transmitting NAN discovery beacon frames 452 and performing NAN scanning 454 between the transmissions of the NAN discovery beacon frames 452. As used herein, a time interval between consecutive NAN discovery beacon frames transmitted by the same NAN device is referred to as an "interframe time interval." An interframe time interval for the NAN discovery beacon frames 452 is indicated in presentation 402 at 456. The NANTSv1.0 specifies a time between consecutive NAN discovery beacon frames transmitted by the same NAN device of between 50 time units (TUs) and 200 TUs. However, for some embodiments, the interframe time interval is longer than 200 TUs.

For some embodiments, a TU is an arbitrary unit of time that indicates a relative relationship between times specified herein and/or with times indicated in TUs appearing within the NANTSv1.0 and other technical specifications directed to NAN operations. In other embodiments, a TU represents 1024 microseconds, in accordance with one or more of the Institute of Electrical and Electronics Engineers (IEEE) 801.11 standards. For a particular embodiment, a TU is equivalent to a millisecond.

Indicated at 458 is a scanning time interval for the NAN device 102. A scanning time interval is the length of time a NAN device scans for NAN discovery beacon frames of other NAN devices between transmissions of its own NAN discovery beacon frames. In presentation 402, for example, the NAN device 102 continuously scans for NAN discovery beacon frames of other NAN devices from the termination of its own NAN discovery beacon frame 452 to the beginning of its next NAN discovery beacon frame.

The NAN discovery beacon frames 452 make the NAN device 102 discoverable to the NAN device 104, provided that the NAN device 104 is scanning for the NAN discovery beacon frames 452 and is within range to receive them. Similarly, the NAN device 102, while it is scanning 454, discovers the NAN device 104 when it receives NAN discovery beacon frames from the NAN device 104.

Carried with NAN discovery beacon frames are NAN information elements (IEs). NAN attributes are incorporated in the NAN IEs, which, for some embodiments, adhere to a vendor-specific implementation. Each NAN device can both generate NAN IEs for transmission and decode received NAN IEs. A NAN IE carried by the NAN discovery beacon frame received from the NAN device 104 communicates to the NAN device 102 a service and/or information being sought or offered by the NAN device 104. If the service and/or information being sought or offered by the NAN device 104 is being offered or sought, respectively, by the NAN device 102, then the NAN devices 104 and 102 form a direct connection with each other using a protocol sufficient to provide the service and/or information. The direct connection, using, for example, Wi-Fi direct or some other peer data connection, occurs without the need for local area network (LAN) or wide area network (WAN) infrastructure.

Individual NAN devices which have discovered one another can also group into a NAN cluster. A NAN cluster is a collection of NAN devices that share a common set of NAN parameters and are synchronized to the same discovery window schedule, for instance, as specified in the NANTSv1.0. The NAN devices 110, 112, 114 of the NAN cluster 108 send and receive NAN transmissions between themselves, as indicated at 116, 118, and 120. Using the transmissions, the NAN devices 110, 112, 114 participate in a NAN master device selection procedure, which is based on a relative ranking of parameters between the NAN devices 110, 112, 114. The NAN device elected as master, taken to be the NAN device 110, controls the timing of cluster 108 operations. The subordinate NAN devices 112 and 114 synchronize with the master NAN device 110 to determine the discovery window schedule and the timing of NAN synchronization beacon frames.

All of the NAN devices 110, 112, 114 operating in the NAN cluster 108 transmit and receive NAN service discovery frames to communicate available services and information. Only the master NAN device 110, however, transmits NAN discovery beacon frames. The subordinate NAN devices 112, 114 discontinue transmitting NAN discovery beacon frames until such time as they assume the role of the master device or are no longer participating in the NAN cluster 108. The NAN cluster 108 is discoverable to the NAN device 102 by NAN discovery beacon frames being transmitted by the master NAN device 110.

Figure 2:
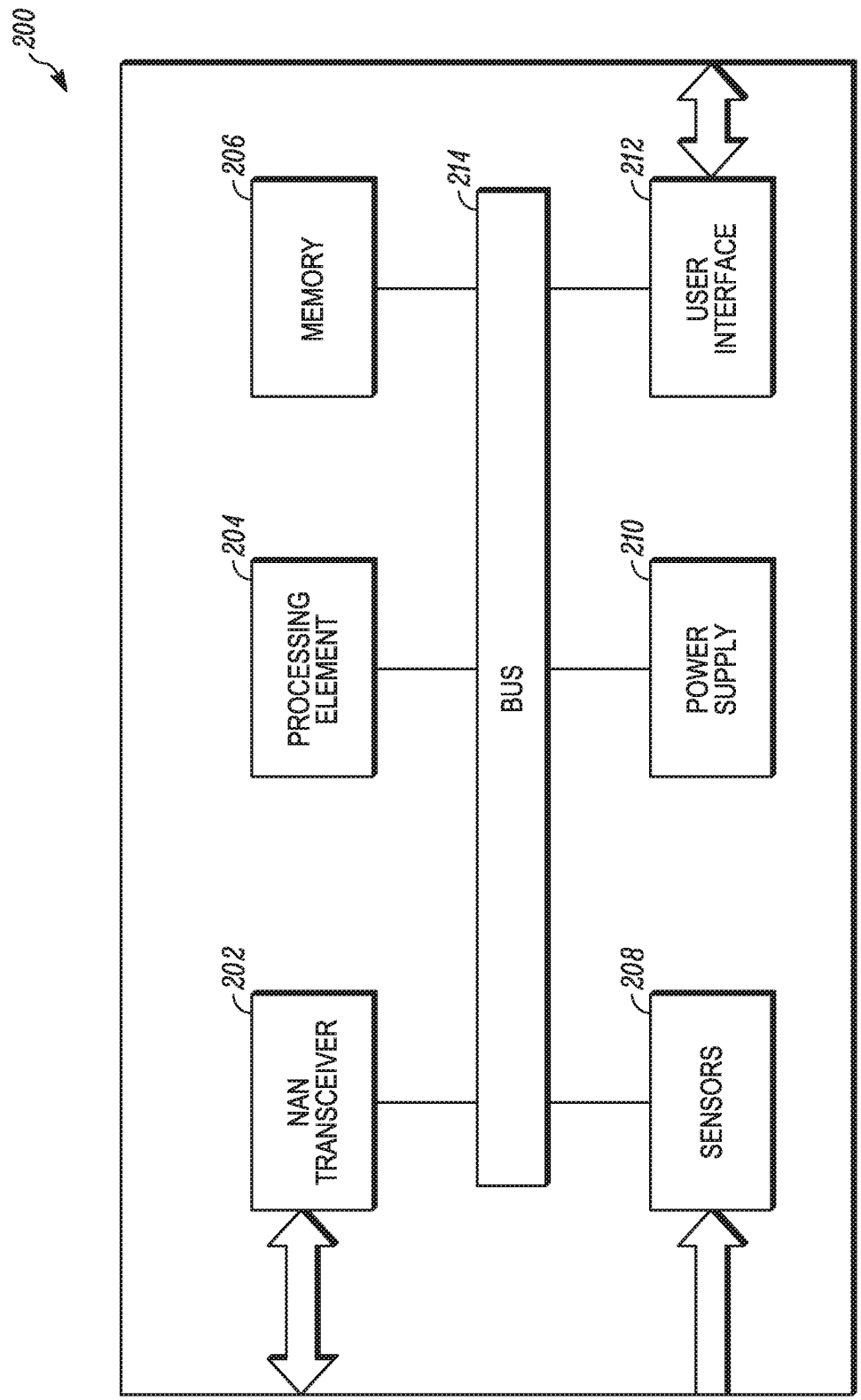
FIG. 2 shows a block diagram of a NAN communication device with internal components, in accordance with some embodiments.

FIG. 2 shows a block diagram of a NAN device 200 in accordance with embodiments of the present teachings. For a particular embodiment, the NAN device 200 represents the NAN device 102. Included within the NAN device 200 is a NAN transceiver 202, a processing element 204, memory 206, a set of one or more sensors 208, a power supply 210, and a user interface 212, which are all operationally interconnected by internal connections such as a bus 214.

A limited number of device components 202, 204, 206, 208, 210, 212, 214 are shown within the NAN device 200 for ease of illustration. Other embodiments may include a lesser or greater number of components in a NAN device. Moreover, other components needed for a commercial embodiment of a NAN device that incorporates the components 202, 204, 206, 208, 210, 212, 214 shown for the NAN device 200 are omitted from FIG. 2 for clarity in describing the enclosed embodiments.

In general, one or more of the device components 202, 204, 206, 208, 210, 212, 214 are configured with functionality in accordance with embodiments of the present disclosure as described herein with respect to the remaining figures. "Configured," "adapted," "operative," or "capable," as used herein, means that indicated components are implemented using one or more hardware elements, which may or may not be programmed with software and/or firmware, as the means for the indicated components to implement their desired functionality. For an example, at least one of the components 202, 204, 206, 208, 210, 212, 214 can be configured through executing algorithms consistent with the diagrams shown in FIGS. 3, 4, 5, and 6 and the accompanying description.

The processing element 204, for instance, includes arithmetic logic and control circuitry necessary to perform the digital processing, in whole or in part, for the NAN device 200 to detect an indication of presence and to responsively transmit a series of NAN discovery beacon frames with a particular set of one or more attributes. For one embodiment, the processing element 204 represents a primary microprocessor, also referred to as a central processing unit (CPU), of the NAN device 200. For example, the processing element 204 can represent an application processor of a tablet. In another embodiment, the processing element 204 is an ancillary processor, separate from the CPU, wherein the ancillary processor is dedicated to providing the processing capability, in whole or in part, needed for the components 202, 206, 208, 210, 212, 214 of the NAN device 200 to perform at least some of their intended functionality.

The memory 206 provides storage of electronic data used by the processing element 204 in performing its functionality. For example, the processing element 204 can use the memory 206 to load applications, save settings, and/or store files associated with the discovery of and communication with other NAN devices. In one embodiment, the memory 206 represents random access memory (RAM). In other embodiments, the memory 206 represents volatile or non-volatile memory. For a particular embodiment, a portion of the memory 206 is removable. For example, the processing element 204 can use RAM to cache data while it uses a micro secure digital (microSD) card to store files associated with functionality performed in conjunction with discovering NAN devices.

The NAN transceiver 202 includes components which allow it to both send and receive NAN transmissions, such as NAN transmissions identified in the NANTSv1.0. In some embodiments, these transmissions are sent and received on Wi-Fi channel 6 (2.437 GHz) in the 2.4 GHz frequency band. In other embodiments, the transmissions are sent and received on Wi-Fi channel 44 (5.220 GHz) and/or channel 149 (5.745 GHz) in the 5 GHz frequency band. For described embodiments, NAN transmissions include NAN discovery beacon frames. In some embodiments, NAN transmissions further include NAN service discovery frames, such as publish and/or subscribe messages.

The user interface 212 represents a set of one or more components that allow for communication between the NAN device 200 and a user, owner, and/or programmer of the NAN device 200. In some embodiments, the user interface 212 includes an input component, such a keypad, which allows an individual to enter data into the NAN device 200. A user, for example, might use the input component 212 to provide an application executing on the NAN device 200 with criteria by which particular services in which the user is interested may be identified. In other embodiments, the user interface 212 includes an output component, such a display or speaker, which allows an individual to receive information from the NAN device 200. The NAN device 200 might present notifications of available services for which the user has indicated interest. For additional embodiments, the user interface 212 includes both an input component and an output component, which allow for a bi-directional flow of information between the user and the NAN device 200. The NAN device 200, for example, might include a touchscreen configured for displaying images and text and also for receiving tactile input.

The power supply 210 represents a power source that supplies electric power to the device components 202, 204, 206, 208, 212, 214 as needed, during the course of their normal operation. The power is supplied to meet the individual voltage and load requirements of the device components 202, 204, 206, 208, 212, 214 that draw electric current. For some embodiments, the power supply 210 is a wired power supply that provides direct current from alternating current using a full- or half-wave rectifier. For other embodiments, the power supply 210 is a battery that powers up and runs a portable NAN device. For a particular embodiment, the battery 210 is a rechargeable power source. A rechargeable power source for a NAN device is configured to be temporarily connected to another power source external to the NAN device to restore a charge of the rechargeable power source when it is depleted or less than fully charged. In another embodiment, the battery 210 is simply replaced when it no longer holds sufficient charge.

The set of sensors 208 includes one or more sensors configured to detect that a human is near the NAN device 200. For some embodiments the set of sensors 208 includes one or more sensors configured to detect that a user of the NAN device 200 is near the NAN device 200. In different embodiments, the set of sensors 208 can include a touch sensor, a thermal sensor, an infrared sensor, a microphone, a camera, an accelerometer, and/or other sensors in various combinations.

Figure 3:
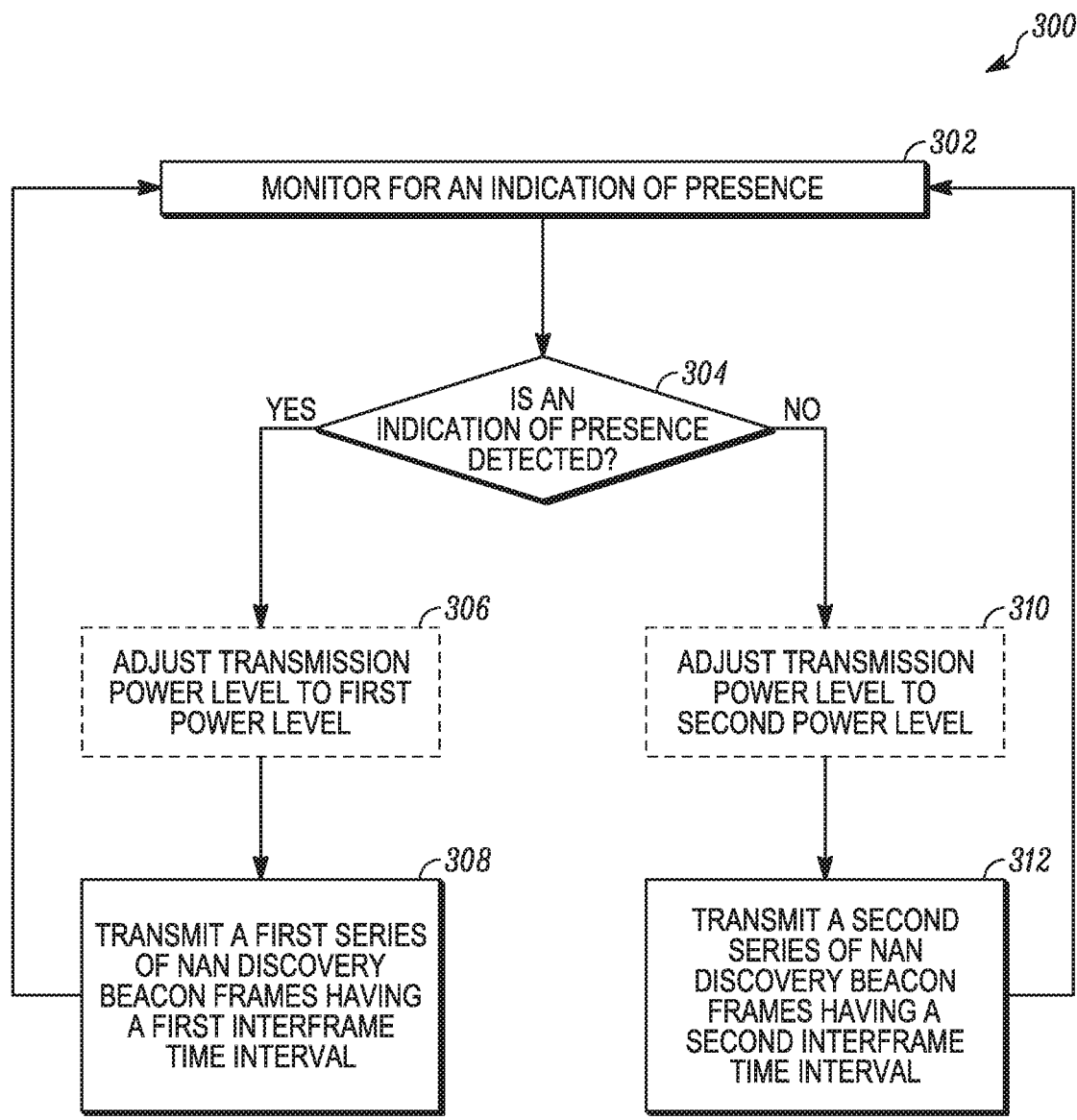
FIG. 3 shows a logical flow diagram illustrating a method for performing NAN transmitting with different interframe time intervals based on presence, in accordance with some embodiments.

A detailed description of the functionality of the NAN device 102 shown in FIG. 1 using the components shown FIG. 2 is provided with reference to the remaining figures. FIG. 3, for example, shows a logical flow diagram illustrating a method 300 performed by a NAN device, taken to be the NAN device 102, for transmitting different series of NAN discovery beacon frames with different attributes depending on whether or not presence is detected relative to the NAN device 102. The NAN device 102 monitors 302 for an indication of presence. For some embodiments, monitoring means that one sensor or a static or varying combination of the sensors 108 of the NAN device 102 are continuously or intermittently, over a period of time, attempting to detect human presence. In other embodiments, monitoring means that a set of one or more components of the NAN device 102, such as the processing element 204, is detecting if a pending task on the NAN device 102 can be completed by a service provided by another NAN device or if a user of the NAN device 102 has specified to the NAN device 102 a service provided by another NAN device. While monitoring 302, the NAN device 102 determines 304 if an indication of presence is detected.

In a first group of embodiments, the NAN device 102 detecting an indication of presence includes the NAN device 102 detecting that a human is near the NAN device 102. In some embodiments, near the NAN device 102 means within a detectable range of one or more of the sensors 208. In other embodiments, near the NAN device 102 means within a threshold range of the NAN device 102. In different embodiments, for example, the threshold range falls within 15 meters. For some embodiments, the threshold range is dependent upon which sensor, in accordance with its capabilities, of the set of sensors 208 is detecting presence. The threshold range for a microphone used in performing voice recognition, for example, falls within 10 meters, while the threshold range of an infrared proximity sensor falls within 2.5 meters. The assumption is that the user has less interest in the NAN device 102 discovering and connecting with another NAN device when he leaves the NAN device 102 unattended.

For the first group of embodiments, at least one of the sensors 208 is configured to detect if a human, presumably the user, is near the NAN device 102. Different sensors can detect the user at different ranges or confirm a detection made by another sensor.

In a first example, a microphone of the NAN device 102 operates a sensor to detect the user's presence. The microphone receives sound as the user speaks near the NAN device 102. The received sound is processed by speech-recognition components of the NAN device 102 to determine that the user's voice was included in the received sound. The processing element 204 then makes a determination that the user is near the NAN device 102.

In a second example, touch sensors embedded within a housing of the NAN device 102 detect, by means of pressure or capacitance, that the NAN device 102 is being held. The processing element 204 responsively determines the user is near the NAN device NAN. If the detected pressure or capacitance is inconsistent with the user's grip, being consistent instead with lying on a flat surface, then the processing element may determine, using additional feedback from other sensors, that the user is not near the NAN device 102.

In a third example, a thermal sensor, which registers temperature, temperature variation, or infrared radiation, detects a heat signature determined by the processing element 204 to indicate the presence of a human. The sensor, for instance, detects heat from a source resembling the size and shape of a human.

In a fourth example, an accelerometer of the NAN device 102 registers regularly occurring impulses or decelerations consistent with the footfalls of the user walking or jogging with the NAN device 102. The processing element determines from these sensor readings, and additionally from indications received from other sensors, that the user is present near the NAN device 102.

In a fifth example, a camera of the NAN device 102 captures images from in front of the NAN device 102. In further embodiments, a rear-mounted camera also captures images from behind the NAN device 102. One of the images includes a human's head. From the angle subtended by the head within the image given the zoom setting of the camera, the processing element 204 determines a distance from the camera at which the human is located. In an embodiment for which the indication of presence is contingent upon the detected human being the user of the NAN device 102, a facial recognition algorithm is applied to a face of the head captured in the image to determine if it belongs to the user. In further embodiments, facial and/or speech recognition is used in combination with another sensor, for example, the thermal sensor, to determine if a detected human is the user.

For some embodiments, not detecting an indication of presence is based on positive detection. For example, one or more of the sensors 208 detect the user, but the processing element determines from indications received from the sensors that the user is beyond the threshold range. In other embodiments, the NAN device not detecting an indication of presence means that a combination of the sensors 208, operating collectively, failed to detect human presence.

In a second group of embodiments, the NAN device 102 detecting an indication of presence includes the NAN device 102 detecting a pending task that is dependent upon the availability of a NAN service from an external NAN device. Completion or continuance of the task pending on the NAN device 102 is contingent upon the NAN device 102 accessing the NAN service, which is provided by another NAN device. For example, a print job is queued on the NAN device 102, but the NAN device 102 is not connected to a printer. The NAN device 104 does have printing capability and offers this capability to other NAN devices as a NAN service.

In a third group of embodiments, the NAN device 102 detecting an indication of presence includes the NAN device 102 detecting that an application executing on the NAN device 102 has at least one NAN service specified, wherein the specified NAN service is provided by an external NAN device. The application controls the circumstances under which the NAN device 102 connects with other NAN devices to avail itself of NAN services provided by other NAN devices. If the user specifies to the application with input, using the user interface 212, a NAN service being sought by the user, which for some embodiments includes access to information, then the NAN device 102 can discover and connect with another NAN device offering the specified NAN service. If no NAN service is specified to the application by the user, and if no NAN service is specified by default, then the NAN device 102 does not actively seek to discover particular NAN devices offering particular services.

An indication of presence exists, for example, when the user of the NAN device 102 specifies to the application executing on the NAN device that he wishes to receive photographs from other NAN devices in attendance at a sporting event. Without a NAN services being specified to the application by the user, no indication of presence is detected.

If the NAN device 102 detects 304 an indication of presence, then the NAN device 102 performs NAN transmitting, and in some instances, also NAN scanning, in accordance with a first set of attributes. As shown for the method 300, the NAN device 102 transmits 308 a first series of NAN discovery beacon frames with a first interframe time interval. For another embodiment, the NAN device 102 also adjusts 306 a transmission power level for the first series of NAN discovery beacon frames to a first power level.

If the NAN device 102 does not detect 304 an indication of presence, then the NAN device 102 performs NAN transmitting, and in some instances, also NAN scanning, in accordance with a second set of attributes. The second set of attributes is different from the first set of attributes in a way that allows the NAN device 102 to perform NAN transmitting and/or NAN scanning while consuming less power when an indication of presence is not detected. As shown for the method 300, the NAN device 102 transmits 312 a second series of NAN discovery beacon frames with a second interframe time interval, which is longer than the first interframe time interval. For a further embodiment, the NAN device 102 adjusts 310 a transmission power level for the second series of NAN discovery beacon frames to a second power level, which is less than the first power level.

While transmitting 308, 312, the NAN device 102 continues to monitor 302 for an indication of presence and determine 304 if an indication of presence is detected. Upon detecting 304 an indication of presence when it was not detected before, the NAN device 102 transitions from transmitting 312 the second series of NAN discovery beacon frames having the second interframe time interval to transmitting 308 the first series of NAN discovery beacon frames having the first interframe time interval. Upon not detecting 304 an indication of presence when it was detected before, the NAN device 102 transitions from transmitting 308 the first series of NAN discovery beacon frames having the first interframe time interval to transmitting 312 the second series of NAN discovery beacon frames having the second interframe time interval.

Turning again to FIG. 4, transmission 308, 312 of the first and second series of NAN discovery beacon frames is described in greater detail. The first presentation 402 of FIG. 4, described previously, graphically represents the NAN device 102 transmitting 308 the first series of NAN discovery beacon frames 452 with the first interframe time interval 456. An icon 450 graphically represents an indication of presence. For some embodiments, the first interframe time interval 456 is between 50 to 200 TUs, in accordance with the NANTSv1.0. The scanning time intervals 458, which for some embodiments are also between 50 to 200 TUs in length, refer to the periods of time between the NAN discovery beacon frames 452 that the NAN device 102 performs NAN scanning. The scanning time interval 458 is associated with a scanning block 454. A scanning block refers to the NAN scanning the device 102 performs during a scanning time interval.

By contrast to the first presentation 402, the second 404, third 406, and fourth 408 presentations of FIG. 4 illustrate different embodiments of the NAN device 102 transmitting 312 the second series of NAN discovery beacon frames while the NAN device 102 is not detecting an indication of presence. In general, the three representations 404, 406, 408 of the second series of NAN discovery beacon frames are shown with longer interframe time intervals and/or shorter scanning time intervals. This allows transmission 312 of the second series of NAN discovery beacon frames to be more energy efficient than transmission 308 of the first series of NAN discovery beacon frames 452. In particular embodiments, interframe time intervals 466, 476, and 490 of the second series of NAN discovery beacon frames as represented in presentations 404, 406, and 408, respectively, are longer than the 200 TUs specified as an upper bound in the NANTSv1.0.

For some embodiments, the NAN device 102 generates the second series of NAN discovery beacon frames by skipping a number of NAN discovery beacon frames as compared with generation of the first series of NAN discovery beacon frames. In further embodiments, the NAN device 102 also generates the second series of NAN discovery beacon frames by skipping a number of scanning time intervals as compared with generation of the first series of NAN discovery beacon frames. Presentation 404 illustrates ways in which the NAN device 102 can generate the second series of NAN discovery beacon frames 562 by skipping a number of NAN discovery beacon frames and accompanying scanning blocks.

As compared to presentation 402 for the first series of NAN discovery beacon frames 452, every other NAN discovery beacon frame is omitted from presentation 404, along with the scanning block that immediately followed the omitted NAN discovery beacon frame. For scanning blocks 464 and NAN discovery beacon frames 462 that remain, scanning time intervals 468 are of the same length as the scanning time intervals 458, but the interframe time intervals 466 have doubled as compared to the interframe time intervals 456 for presentation 402. In effect, the skipping of every other NAN discovery beacon frame 452 and scanning block 454 shown in presentation 402 is the same as doubling the separation between the NAN discovery beacon frames 452. In each case, the result is the second series of NAN discovery beacon frames 462 shown in presentation 404.

In other embodiments, the NAN device 102 generates the second series of NAN discovery beacon frames by skipping different combinations of NAN discovery beacon frames as compared to the first series of NAN discovery beacon frames. Labeling the first series of NAN discovery beacon frames, shown in presentation 402 without omissions, with successive positive integers "1-2-3-4-5," and the second sequence of every other NAN discovery beacon frame 462 and scanning block 464, illustrated in presentation 406, with the sequence of successive odd integers "1-3-5-7-9," for example, additional embodiments of the second series of NAN discovery beacon frames are represented by other sequences, such as "1-4-7-10-13," "1-2-4-5-7," and "1-4-5-8-9." Presentation 408 shows a second series of NAN discovery beacon frames represented by the sequence "1-2-5-6-9."

In some instances, the second series of NAN discovery beacon frames has scanning time intervals which are discontinuous in time. As compared to the first series of NAN discovery beacon frames 452 shown in presentation 402, the scanning blocks 464 in the second series of NAN discovery beacon frames 462 shown in presentation 404 are separated from one another by an amount of time greater than the duration of the NAN discovery beacon frames 462 being transmitted. For various embodiments, discontinuous NAN scanning in the second series of NAN discovery beacon frames is more energy efficient than continuous NAN scanning in the second series of NAN discovery beacon frames.

Continuous NAN scanning occurs without interruption, notwithstanding the duration of NAN discovery beacon frame transmissions, or other NAN transmissions, for which NAN scanning may briefly cease. In presentation 402, for example, NAN scanning is continuous, occurring at every time a NAN discovery beacon frame, or other NAN frame, is not being transmitted. Discontinuous NAN scanning occurs if there are periods of time when a NAN device both is not sending a NAN transmission and not performing NAN scanning. NAN scanning is discontinuous in presentation 408, for example. During the latter portion of time interval 490, the NAN device 102 is not performing NAN scanning or sending a NAN transmission. A scanning time interval 488, for instance, is a discontinuous scanning time interval, whereas the scanning time interval 458 is a continuous scanning time interval.

For some embodiments, the NAN device 102 transmits NAN discovery beacon frames in the second series of NAN discovery beacon frames with a lower power than for the NAN discovery beacon frames in the first series of NAN discovery beacon frames. This is illustrated in presentation 406. The interframe time interval 476, scanning time interval 478, and position of each scanning block 474 in the second series of NAN discovery beacon frames 472 shown in presentation 406 are the same as the interframe time interval 466, scanning time interval 468, and position of each scanning block 464 in the second series of NAN discovery beacon frames 562 shown in presentation 404. The NAN discovery beacon frames 472, however, are transmitted with a lower power than the NAN discovery beacon frames 462 and the NAN discovery beacon frames 452, shown in presentations 404 and 402, respectively, as indicated by the shorter relative height of the NAN discovery beacon frames 472 in presentation 406.

Transmitting the NAN discovery beacon frames 472 with a lower power can conserve battery charge but also limit the range at which the NAN discovery beacon frames 472 can be received by other NAN devices. In various embodiments, a different balance is struck between these competing factors. For some embodiments, the lower power of transmission for the second series of NAN discovery beacon frames 472 is at a power level that generates a transmission range matched to a size of an area in which the NAN device 102 is located. This might be based on a philosophy that only trusted NAN devices are located within the area.

In the user's corporate office, for example, the NAN device 102 is surrounded by other NAN devices owned by the corporation. Because all the NAN devices are commonly owned, all the NAN devices are trusted devices of the NAN device 102. If the user leaves his NAN device 102, the NAN device 102 can still discover and connect with other corporate NAN devices. NAN devices that are not owned by the corporation, for which the user's authorization to connect would be required, are outside of the corporate office and beyond range of the NAN discovery beacon frames 472 being transmitted with reduced power while an indication of the user's presence is not detected.

When the user returns, he is available to provide authorization, and the NAN device 102 reaches out to other NAN devices beyond the corporate office by reestablishing its full transmission power. For various embodiments, the reduced transmission power level for the second series of NAN discovery beacon frames 472 can be matched to different areas, for example, the area of an office, group of offices, or a suite within a building. An added benefit of transmitting at a reduced power level and increasing interframe time intervals is lowering transmission congestion when multiple NAN devices are transmitting on a common channel.

For some embodiments, the second series of NAN discovery beacon frames is an evenly-spaced series in time defined by a single interframe time interval. In presentation 406, for example, the interframe time interval between any two successive NAN discovery beacon frames 472 is the same. Therefore, a single interframe time interval, namely, the interframe time interval 476, fully defines the spacing for all the NAN discovery beacon frames 472 of the series.

In other embodiments, the second series of NAN discovery beacon frames is an unevenly-spaced series in time defined by multiple interframe time intervals. This is illustrated in presentation 408, for which every other NAN discovery beacon frame pair is skipped as compared to the first series of NAN discovery beacon frames 452 shown in presentation 402. Where a NAN discovery beacon frame is not skipped, an interframe time interval 486 indicates the time between successive NAN discovery beacon frames 482. Where a NAN discovery beacon frame pair is skipped, the interframe time interval 490 indicates the time between successive NAN discovery beacon frame 482. In total, two interframe time intervals 486, 490 are needed to fully define the spacing of the second series of NAN discovery beacon frames 482 shown in presentation 408. For other embodiments, different multiplicities of interframe time intervals are needed to fully describe the different spacings of different representations of the second series of NAN discovery beacon frames.

For a number of embodiments, the second series of NAN discovery beacon frames includes a scanning time interval, referred to as the second scanning time interval, which is shorter than a first scanning time interval for the first series of NAN discovery beacon frames. As shown for the second series of NAN discovery beacon frames 482 in presentation 408, for example, a second scanning time interval 488 for scanning blocks 484 is shorter than the first scanning time interval 458 for the scanning blocks 454 of the first series of NAN discovery beacon frames 482 in presentation 402. For alternate embodiments, the second series of NAN discovery beacon frames can have multiple scanning time intervals describing scanning blocks of different lengths.

In some embodiments, the second series of NAN discovery beacon frames has a second scanning time interval which is shorter than the second interframe time interval. For the second series of NAN discovery beacons 462 as shown in presentation 404, the scanning time interval 468 is shorter than the interframe time interval 466. This is also true for the second series of NAN discovery beacons 472 as shown in presentation 406. For presentation 408, the scanning time interval 488 of the second series of NAN discovery beacon frames is shorter than both the interframe time interval 486 and the interframe time interval 490.

Figure 5:
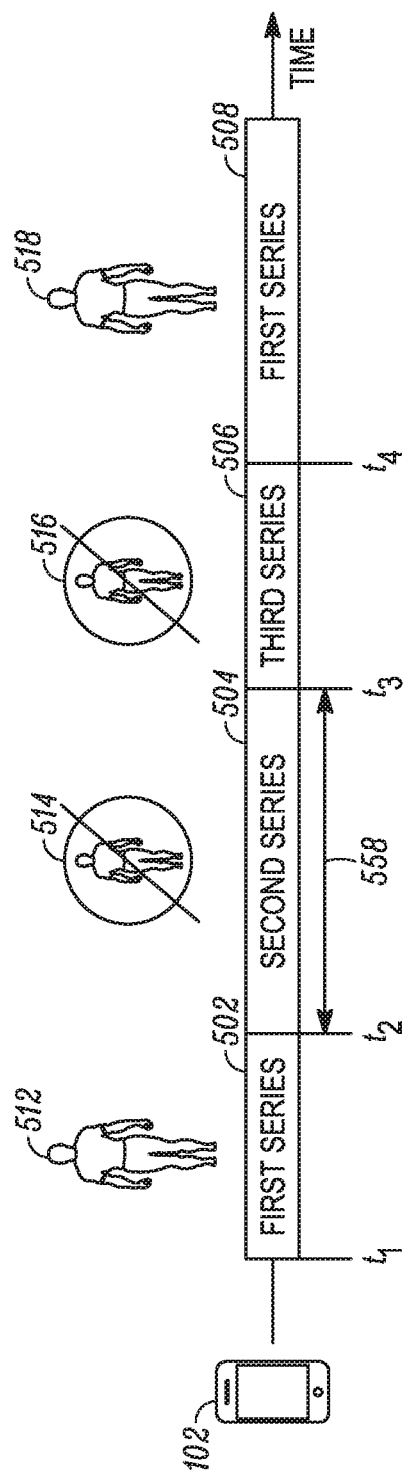
FIG. 5 shows a schematic diagram of a NAN communication device transmitting different series of NAN discovery beacon frames, in accordance with some embodiments.

FIG. 5 shows a schematic diagram of the NAN device 102 transmitting different series of NAN discovery beacon frames at different times depending upon if an indication of presence is detected or when an indication of presence was last detected. This includes the NAN device 102 determining a length of time since the indication of presence was last detected. When the length of time is longer than a threshold length of time, the NAN device 102 transitions from transmitting the second series of NAN discovery beacon frames to transmitting a third series of NAN discovery beacon frames. The third series of NAN discovery beacon frames has a third interframe time interval that is longer than the second interframe time interval.

While the NAN device 102 detects the presence of its user, as indicated by an icon 512, the NAN device 102 transmits the first series of NAN discovery beacon frames, as indicated at 502, beginning at time $t_1$. The NAN device 102 continues to transmit the first series of NAN discovery beacon frames until time $t_2$, at which time the NAN device 102 no longer detects the user, as indicated by an icon 514. At time $t_2$, the NAN device 102 transitions from transmitting the first series of NAN discovery beacon frames to transmitting the second series of NAN discovery beacon frames, as indicated at 504.

In many instances, the user is only briefly absent. For example, he might leave the NAN device 102 behind in his office while visiting a vending machine. When the user returns, the NAN device 102 again detects his presence and transitions from transmitting the second series of NAN discovery beacon frames to transmitting the first series of NAN discovery beacon frames.

In some instances, however, the user will leave the NAN device 102 for extended periods of time. This is illustrated by FIG. 5. At time $t_3$, the NAN device 102 still does not detect an indication of the user's presence, as indicated by the icon 516. The period of time that elapses from time $t_2$ to time $t_3$ is a threshold length of time 558. When the NAN device 102 does not detect an indication of the user's presence for the threshold length of time 558, the NAN device 102 transitions to transmitting the third series of NAN discovery beacon frames, as indicated at 506. In different embodiments, the threshold length of time 558 is a factory default setting or elected and set by the user.

With the user being absent for the threshold length of time 558, the user's prompt return becomes increasingly unlikely. In response, the NAN device 102 transitions to transmitting the third series of NAN discovery beacon frames, which results in additional power savings over the NAN device 102 continuing to transmit the second series of NAN discovery beacon frames. This is because an interframe time interval for the third series of NAN discovery beacon frames is greater than the interframe time interval for the second series of NAN discovery beacon frames.

The NAN device 102 continues to transmit the third series of NAN discovery beacon frames until time $t_4$ when the NAN device 102 again detects an indication of the user's presence, as indicated by icon 518. This results in the NAN device 102 transitioning from transmitting the third series of NAN discovery beacon frames back to transmitting the first series of NAN discovery beacon frames, as indicated at 508. For a particular embodiment, the combination of the interframe time interval and the scanning time interval for each of the first, second, and third series of NAN discovery beacon frames results in the collective transmission and scanning of the third series being more power efficient per unit time as compared to the second series and the collective transmission and scanning of the second series being more power efficient per unit time as compared to the first series.

For a number of embodiments, the NAN device 102 transmitting the first and second series of NAN discovery beacon frames is dependent upon, at least in part, the NAN device 102 detecting NAN transmissions from another NAN device. When not detecting NAN discovery beacon frames being transmitted by another NAN device, for example, the NAN device 102 transmits the second series of NAN discovery beacon frames with a second power level that is lower than a first power level. Transmitting the second series of NAN discovery beacon frames with the second power level reduces the rate at which the NAN device 102 depletes charge from the battery 210 as compared to transmitting the first series of NAN discovery beacon frames with the first power level.

While not detecting NAN discovery beacon frames transmitted by another NAN device, the NAN device 102 transitions from transmitting the second series of NAN discovery beacon frames with the second power level to transmitting the first series of NAN discovery beacon frames with the second power level. The first series of NAN discovery beacon frames has more scanning time intervals over a period of time and/or longer scanning time intervals as compared to the second series of NAN discovery beacon frames. This allows the NAN device 102 to more effectively detect whether another NAN device has come within range of the NAN device 102 while still using the lower second transmission power level.

The NAN device 102 monitors for NAN discovery beacon frames transmitted by another NAN device. When detecting NAN discovery beacon frames transmitted by another communication device, the NAN device 102 transmits the first series of neighbor awareness networking discovery beacon frames with the first power level. Transitioning from the second power level to the first power level while transmitting the first series of NAN discovery beacon frames allows the other NAN device to better detect the NAN device 102. If the NAN device 102 does not detect discovery beacon frames transmitted by another NAN device, the NAN device 102 transitions back to transmitting the second series of NAN discovery beacon frames with the second power level.

Intermittently, at regular, irregular, random, or pseudo-random time intervals, the NAN device 102 again briefly transitions to transmitting the first series of NAN discovery beacon frames at the second power level to more effectively monitor for the NAN transmissions of another NAN device. If incoming NAN transmissions are detected, the NAN device 102 begins transmitting the first series of NAN discovery beacon frames with the first power level. Otherwise, the NAN device 102 transitions back to transmitting the second series of NAN discovery beacon frames with the second power level. For a particular embodiment, the NAN device 102 transmits both the first and second series of NAN discovery beacon frames at the first power level.

Figure 6:
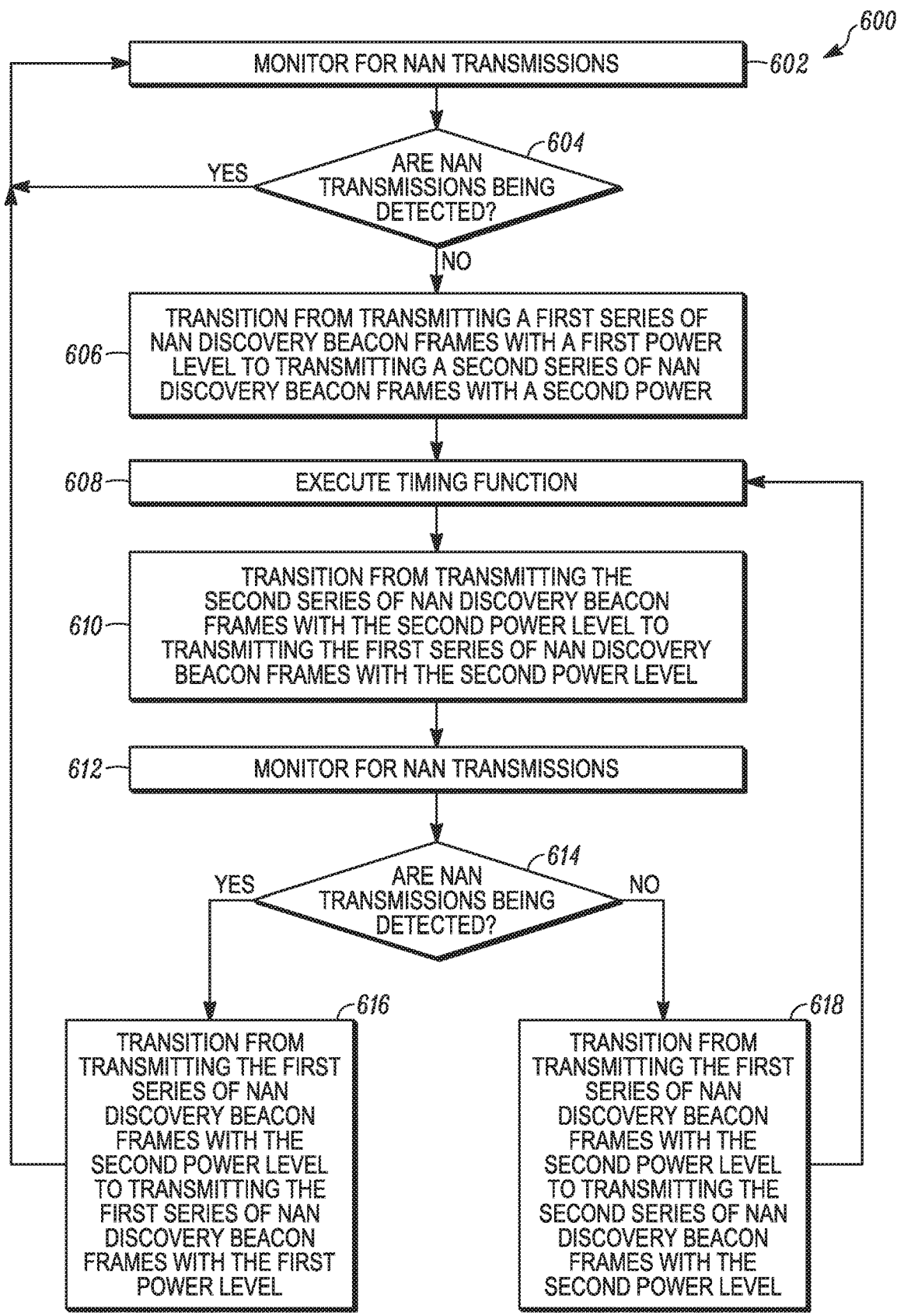
FIG. 6 shows a logical flow diagram illustrating a method for performing NAN transmitting with different interframe time intervals based on the detection of NAN transmissions, in accordance with some embodiments.

FIG. 6 shows a logical flow diagram illustrating a method 600 for which the NAN device 102 detecting NAN transmissions determines, at least in part, which series of NAN discovery beacon frames the NAN device 102 transmits. The method 600 begins with the NAN device 102 monitoring 602 for NAN transmission, such as NAN discovery beacon frames being transmitted by other NAN devices. For some embodiments, the NAN device 102 also monitors for NAN service discovery frames. The NAN device 102 monitors 602 for NAN transmissions, for example, while detecting an indication of presence and transmitting a first series of NAN discovery beacon frames with a first power level.

While the NAN device 102 determines 604 NAN transmissions are being detected, the NAN device 102 continues to monitor 602 for NAN transmissions. When the NAN device 102 determines 604 it is no longer receiving NAN transmissions, such as when another NAN device passes out of range, the NAN device 102 transitions 606 from transmitting the first series of NAN discovery beacon frames with the first power level to transmitting a second series of NAN discovery beacon frames with a second power level which is lower than the first power level. For some embodiments, the NAN device 102 continues to monitor for NAN transmissions while transmitting the second series of NAN discovery beacon frames. However, the reduction in the occurrences of scanning time intervals, which in some instances are also shorter, can make monitoring for NAN transmissions less effective while the NAN device 102 is transmitting the second series of NAN discovery beacon frames.

To make monitoring for NAN transmissions more effective, the NAN device 102 intermittently transitions 610 back to transmitting the first series of NAN discovery beacon frames. To accomplish this, the NAN device 102 executes 608 a timing function. In one embodiment, the timing function is performed by a clock of the NAN device 102 measuring the passage of a time interval. After the passing of a number of seconds, for example, the NAN device 102 transitions 610 from transmitting the second series of NAN discovery beacon frames with the second power level to transmitting first series of NAN discovery beacon frames with the second power level.

In another embodiment, the timing function is pseudorandom. The processing element 204, for example, generates a pseudorandom number between 0 and 1 using a pseudorandom number generating algorithm. The generated pseudorandom number is multiplied by a maximum time interval to determine the time interval to pass before the NAN device 102 proceeds to transition 610 to the transmission of the first series of NAN discovery beacon frames with the second power level.

For a different embodiment, the NAN device 102 uses a truly random number in executing 608 the timing function. For example, the NAN device 102 uses cellular or Wi-Fi infrastructure to access a random number service over the Internet, such as "random.org," which generates randomness via atmospheric noise. In a particular embodiment, the NAN device 102 retrieves a random number, or generates a pseudorandom number, each time the NAN device 102 executes 608 the timing function.

After transitioning 610 to transmitting the first series of NAN discovery beacon frames with the second power level and monitoring 612 for NAN transmissions, the NAN device 102 determines 614 if NAN transmissions are being detected. If NAN transmissions are being detected, then the NAN device 102 transitions from transmitting the first series of NAN discovery beacon frames with the second power level to transmitting the first series of NAN discovery beacon frames with the first power level. The NAN device 102 continues to transmit the first series of NAN discovery beacon frames with the first power level while the NAN device 102 continues to monitor 602 for and detect NAN transmissions. For some embodiments, the continued transmission of the first series of NAN discovery beacon frames is also contingent upon the NAN device continuing to detect an indication of presence.

If the NAN device 102 determines 614 it is not detecting NAN transmissions, then the NAN device 102 transitions from transmitting the first series of NAN discovery beacon frames with the second power level back to transmitting the second series of NAN discovery beacon frames with the second power level. The NAN device 102 repeats the execution 608 of the timing function before again transitioning 610 to transmitting the first series of NAN discovery beacon frames with the second power level and continuing 612 to monitor for NAN transmissions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a communication device, the method comprising:
    monitoring, via a sensor of the communication device, for an indication of presence of a user with respect to the communication device, wherein the indication of presence is based on a comparison of a sound received via the sensor and a user voice associated with the communication device;
    transmitting, when detecting the indication of presence, a first series of neighborhood awareness networking discovery beacon frames having a first interframe time interval; and
    transmitting, when not detecting the indication of presence, a second series of neighborhood awareness networking discovery beacon frames having a second interframe time interval that is longer than the first interframe time interval,
    wherein the second series of neighborhood awareness networking discovery beacon frames comprises a second scanning time interval which is shorter than a first scanning time interval for the first series of neighborhood awareness networking discovery beacon frames.

2. The method of claim 1 further comprising:
    determining a length of time since the indication of presence was last detected; and
    transitioning, when the length of time is longer than a threshold length of time, from transmitting the second series of neighborhood awareness networking discovery beacon frames to transmitting a third series of neighborhood awareness networking discovery beacon frames having a third interframe time interval that is longer than the second interframe time interval.

3. The method of claim 1, wherein the second interframe time interval is longer than 200 time units.

4. The method of claim 1 further comprising:
    transitioning, when not detecting the indication of presence, from the first interframe time interval to the second interframe time interval; and
    transitioning, when detecting the indication of presence, from the second interframe time interval to the first interframe time interval.

5. The method of claim 1, wherein the second scanning time interval is shorter than the second interframe time interval.

6. The method of claim 1, wherein the second series of neighborhood awareness networking discovery beacon frames comprises an evenly-spaced series in time defined by a single interframe time interval, which is the second interframe time interval.

7. The method of claim 1, wherein the second series of neighborhood awareness networking discovery beacon frames comprises an unevenly-spaced series in time defined by multiple interframe time intervals, which includes the second interframe time interval.

8. The method of claim 1, wherein the second series of neighborhood awareness networking discovery beacon frames is generated by one or both of:
    skipping a number of discovery beacon frames; or
    skipping a number of scanning time intervals.

9. The method of claim 1, wherein neighborhood awareness networking discovery beacon frames in the second series of neighborhood awareness networking discovery beacon frames are transmitted with a lower power than neighborhood awareness networking discovery beacon frames in the first series of neighborhood awareness networking discovery beacon frames.

10. The method of claim 9, wherein the lower power of transmission for the second series of neighborhood awareness networking discovery beacon frames is at a power level that generates a transmission range matched to a size of an area in which the communication device is located.

11. The method of claim 1, wherein the detecting of the indication of presence comprises:
    processing the received sound via a speech-recognition component of the communication device; and
    determining that the processed sound includes a user voice associated with the communication device.

12. The method of claim 1, wherein the detecting of the indication of presence further comprises detecting a pending task that is dependent upon the availability of a neighborhood awareness networking service from an external communication device.

13. The method of claim 1, wherein the detecting of the indication of presence further comprises detecting that an application executing on the communication device has at least one neighborhood awareness networking service specified, wherein the specified neighborhood awareness networking service is provided by an external communication device.

14. The method of claim 1 further comprising:
    transmitting, when not detecting neighborhood awareness networking discovery beacon frames transmitted by another communication device, the second series of neighborhood awareness networking discovery beacon frames with a second power level that is lower than a first power level at which the first series of neighborhood awareness networking discovery beacon frames is transmitted when detecting the indication of presence;
    transitioning, based on a timing function, from transmitting the second series of neighborhood awareness networking discovery beacon frames with the second power level to transmitting the first series of neighborhood awareness networking discovery beacon frames with the second power level;

monitoring for the neighborhood awareness networking discovery beacon frames transmitted by another communication device; and transmitting, when detecting the neighborhood awareness networking discovery beacon frames transmitted by another communication device, the first series of neighborhood awareness networking discovery beacon frames with the first power level.

15. A method performed by a communication device, the method comprising:

monitoring, via a sensor of the communication device, for an indication of presence of a user with respect to the communication device, wherein the indication of presence is based on a comparison of a sound received via the sensor and a user voice associated with the communication device;

transmitting, when detecting the indication of presence, a first series of neighborhood awareness networking discovery beacon frames with a first attribute; and transmitting, when not detecting the indication of presence, a second series of neighborhood awareness networking discovery beacon frames with a second attribute, wherein the second series of neighborhood awareness networking discovery beacon frames comprises a second scanning time interval which is shorter than a first scanning time interval for the first series of neighborhood awareness networking discovery beacon frames.

16. The method of claim 15, wherein:

the first attribute comprises a first power level of transmission for the first series of neighborhood awareness networking discovery beacon frames; and the second attribute comprises a second power level of transmission for the second series of neighborhood awareness networking discovery beacon frames, wherein the second power level is less than the first power level.

17. The method of claim 15, wherein:

the first attribute comprises a first interframe time interval for the first series of neighborhood awareness networking discovery beacon frames; and the second attribute comprises a second interframe time interval for the second series of neighborhood awareness networking discovery beacon frames, wherein the second interframe time interval is longer than the first interframe time interval.

18. A communication device comprising:

a set of sensors to detect presence of a user with respect to the communication device and to provide an indication of the presence of the user;

a transmitter to transmit neighborhood awareness networking discovery beacon frames;

a receiver to receive neighborhood awareness networking discovery beacon frames; and a processing element coupled to the set of sensors and the transmitter, wherein the processing element is to:

monitor for an indication of presence of the user with respect to the communication device, wherein the indication of presence is based on a comparison of a received sound and a user voice associated with the communication device;

provide for transmission, when detecting the indication of presence, a first series of neighborhood awareness networking discovery beacon frames comprising a first interframe time interval;

scan, when detecting the indication of presence, for neighborhood awareness networking discovery beacon frames during a first scanning time interval;

provide for transmission, when not detecting the indication of presence, a second series of neighborhood awareness networking discovery beacon frames comprising a second interframe time interval that is greater than the first interframe time interval; and scan, when not detecting the indication of presence, for neighborhood awareness networking discovery beacon frames during a second scanning time interval that is shorter than the first scanning time interval.

\* \* \* \* \*